(12) United States Patent
Schwartz et al.

(10) Patent No.: US 12,408,796 B2
(45) Date of Patent: Sep. 9, 2025

(54) COOKING ASSEMBLY COMPRISING AN ELECTRICAL COOKING APPLIANCE AND A DRAINING BASE

(71) Applicant: SEB S.A., Ecully (FR)

(72) Inventors: Delphine Schwartz, Dijon (FR); Frédéric Seurat, Bretigny (FR)

(73) Assignee: SEB S.A. (FR)

( * ) Notice: Subject to any disclaimer, the term of this patent is extended or adjusted under 35 U.S.C. 154(b) by 1046 days.

(21) Appl. No.: 17/297,803

(22) PCT Filed: Nov. 25, 2019

(86) PCT No.: PCT/EP2019/082438
§ 371 (c)(1),
(2) Date: May 27, 2021

(87) PCT Pub. No.: WO2020/109236
PCT Pub. Date: Jun. 4, 2020

(65) Prior Publication Data
US 2022/0015576 A1  Jan. 20, 2022

(30) Foreign Application Priority Data
Nov. 30, 2018 (FR) ........................................ 1872131

(51) Int. Cl.
*A47J 37/12* (2006.01)

(52) U.S. Cl.
CPC ....... *A47J 37/1285* (2013.01); *A47J 37/1209* (2013.01); *A47J 37/1271* (2013.01); *A47J 37/1276* (2013.01); *A47J 37/128* (2013.01)

(58) Field of Classification Search
CPC ................ A47J 37/1285; A47J 37/1209; A47J 37/1271; A47J 37/1276
See application file for complete search history.

(56) References Cited

U.S. PATENT DOCUMENTS

| 4,920,251 A | * | 4/1990 | Whitenack | A47J 27/04 |
| | | | | 392/386 |
| 6,666,131 B2 | * | 12/2003 | Bizard | A47J 37/1285 |
| | | | | 99/330 |

(Continued)

FOREIGN PATENT DOCUMENTS

| EP | 1504705 A1 | 2/2005 |
| EP | 2103240 A1 | 9/2009 |

OTHER PUBLICATIONS

International Search Report for PCT/EP2019/082438 mailed Feb. 25, 2020; 2 pages.

*Primary Examiner* — Steven W Crabb
*Assistant Examiner* — Fahmida Ferdousi
(74) *Attorney, Agent, or Firm* — Lerner David LLP

(57) ABSTRACT

The invention relates to a cooking assembly (1) which comprises an electrical cooking appliance (2) and a draining base (3), the electrical cooking appliance (2) comprising a vessel (10) provided with a draining device (60) that has a valve (61), the draining base (3) comprising a draining receptacle (70) and a cover (80) for said receptacle, the receptacle cover (80) forming a passage (80a) for discharge of the cooking bath in the draining receptacle (70), said draining base (3) having a control member (4), and the cooking assembly (1) having a draining configuration in which the draining base (3) supports the electrical cooking appliance (2) and in which the control member (4) moves the valve (610 into the open position. According to the invention, the electrical cooking appliance (2) rests on the receptacle cover (80) when the cooking assembly (1) is in the draining configuration.

17 Claims, 10 Drawing Sheets

(56) References Cited

U.S. PATENT DOCUMENTS

| | | | |
|---|---|---|---|
| 9,211,038 B2 * | 12/2015 | Payen | A47J 36/38 |
| 10,065,765 B2 * | 9/2018 | Stanek | B65D 90/24 |
| 11,589,700 B2 * | 2/2023 | Leung | A47J 27/04 |
| 2003/0070557 A1 | 4/2003 | Bizard | |
| 2011/0014342 A1 * | 1/2011 | Picozza | A47J 43/046 99/410 |
| 2018/0153348 A1 | 6/2018 | Man | |

* cited by examiner

COOKING ASSEMBLY COMPRISING AN ELECTRICAL COOKING APPLIANCE AND A DRAINING BASE

CROSS REFERENCE TO RELATED APPLICATIONS

The present application is a national phase entry under 35 U.S.C. § 371 of International Application No. PCT/EP2019/082438 filed Nov. 25, 2019, published in French, which claims priority from French Patent Application No. 1872131 filed Nov. 30, 2018, all of which are incorporated herein by reference.

TECHNICAL FIELD

The present invention generally relates to the technical field of electric cooking appliances comprising a vat capable of receiving a cooking bath, as well as to their accessories.

The present invention relates in particular, but not exclusively, to electric deep fryers comprising a vat capable of receiving an oil or fat bath for frying foods, as well as to their accessories.

The present invention relates more particularly to an assembly comprising an electric cooking appliance comprising a vat equipped with a drainage system, as well as a draining base configured such that the electric cooking appliance can be carried during the draining operation.

PRIOR ART

Document EP1504705 discloses a cooking appliance comprising a vat equipped with a drainage system. The vat can be placed on a draining receptacle to drain the contents of the vat into the draining receptacle. The draining receptacle is associated with a removable lid. However, the lid must be removed to be able to drain the contents of the vat.

Document EP2103240 discloses a cooking appliance comprising a vat equipped with a drainage system. The vat is associated with a draining receptacle comprising a lid with a filling orifice. However, the draining receptacle is inserted into a side opening of a base holding the cooking appliance.

SUMMARY OF THE INVENTION

One purpose of the present invention is to propose an assembly of the aforementioned type that is safe to use.

Another purpose of the present invention is to propose an assembly of the aforementioned type that is economically constructed.

Another purpose of the present invention is to propose a cooking assembly comprising an electric cooking appliance and a draining receptacle that are limited in size.

These purposes are achieved with a cooking assembly comprising an electric cooking appliance and a draining base, the electric cooking appliance comprising a vat capable of receiving a cooking bath, the vat being equipped with a drainage system comprising a valve capable of assuming a stable closed return position and an open position, the draining base comprising a draining receptacle and a receptacle lid, the receptacle lid housing an outlet for the cooking bath to flow into the draining receptacle, the draining base presenting a control element, the cooking assembly presenting a drainage configuration in which the draining base holds the electric cooking appliance and in which the control element moves the valve to the open position due to the fact that the electric cooking appliance rests on the receptacle lid when the cooking assembly is in the drainage configuration. These arrangements make it possible to reduce the lateral dimensions of the draining base while optimizing the capacity of the draining base. A more compact construction can thus be achieved while maintaining good control of the flow of the cooking bath into the draining receptacle due to the presence of the receptacle lid.

Then, advantageously, the receptacle lid comprises side stops configured to limit the lateral movements of the electric cooking appliance resting on the receptacle lid. This arrangement allows for a certain amount of freedom when positioning the electric cooking appliance on the receptacle lid.

Then, advantageously, the receptacle lid has an upper side comprising depressions and the side stops are formed by the side walls of the depressions. This arrangement allows the electric cooking appliance to be freely positioned on the receptacle lid in several directions.

Then, advantageously, the receptacle lid has several main sides, and at least one of the depressions is arranged in an angle defined by two adjacent main sides. This arrangement makes it possible to reduce the dimensions of the draining base.

Also, advantageously, the receptacle lid has four main sides, and each of the depressions is arranged in an angle defined by two adjacent main sides. This arrangement makes it possible to reduce the dimensions of the draining base while facilitating the positioning of the electric cooking appliance on the receptacle lid.

Also, advantageously, the receptacle lid has a peripheral edge and the side stops are surrounded by the peripheral edge. This arrangement makes it easier to position the electric cooking appliance on the receptacle lid.

According to one embodiment, the electric cooking appliance comprises an outer housing encasing the vat and the outer housing rests on the receptacle lid when the cooking assembly is in the drainage configuration. As an alternative, the electric cooking appliance may have no outer housing encasing the vat, the vat then being able to rest on the receptacle lid when the cooking assembly is in the drainage configuration.

Then, advantageously, the outer housing forms a skirt. In other words, the outer housing has no bottom. This arrangement makes it possible to simplify the construction of the outer housing.

Also, advantageously, the outer housing comprises separate housing feet configured to rest on the receptacle lid when the cooking assembly is in the drainage configuration. This arrangement makes it easier to handle the outer housing.

Then, advantageously, the housing feet rest in the depressions when the cooking assembly is in the drainage configuration. This arrangement makes it possible to achieve good stability of the cooking assembly in the drainage configuration.

Also, advantageously, the draining receptacle comprises upper supports extending under the receptacle lid when the receptacle lid closes the draining receptacle. If desired, the receptacle lid can support the upper supports. This arrangement makes it possible to improve the stability of the electric cooking appliance when it is placed on the draining base.

Then, advantageously, the upper supports originate from a side wall of the draining receptacle. This arrangement makes it possible to simplify the construction of the draining receptacle.

Also, advantageously, the upper supports belong to pillars extending from a bottom of the draining receptacle. This arrangement makes it possible to rigidify the side wall of the draining receptacle when the draining base is holding the electric cooking appliance, which contributes to improving the stability of the electric cooking appliance when it is held by the draining receptacle. This arrangement also makes it possible to reduce the dimensions of the cooking assembly.

Advantageously, the upper supports are arranged below the depressions.

Also, advantageously, the electric cooking appliance has lower supports spaced apart from each other and the lower supports are arranged vertically above the upper supports when the electric cooking appliance rests on the receptacle lid. This arrangement makes it easier to handle the electric cooking appliance.

BRIEF DESCRIPTION OF THE DRAWINGS

The invention will be best understood from the study of an exemplary embodiment, taken without any limitation, illustrated in attached FIGS. 1 to 15, and of variants.

DESCRIPTION OF THE EMBODIMENTS

Figure 1:
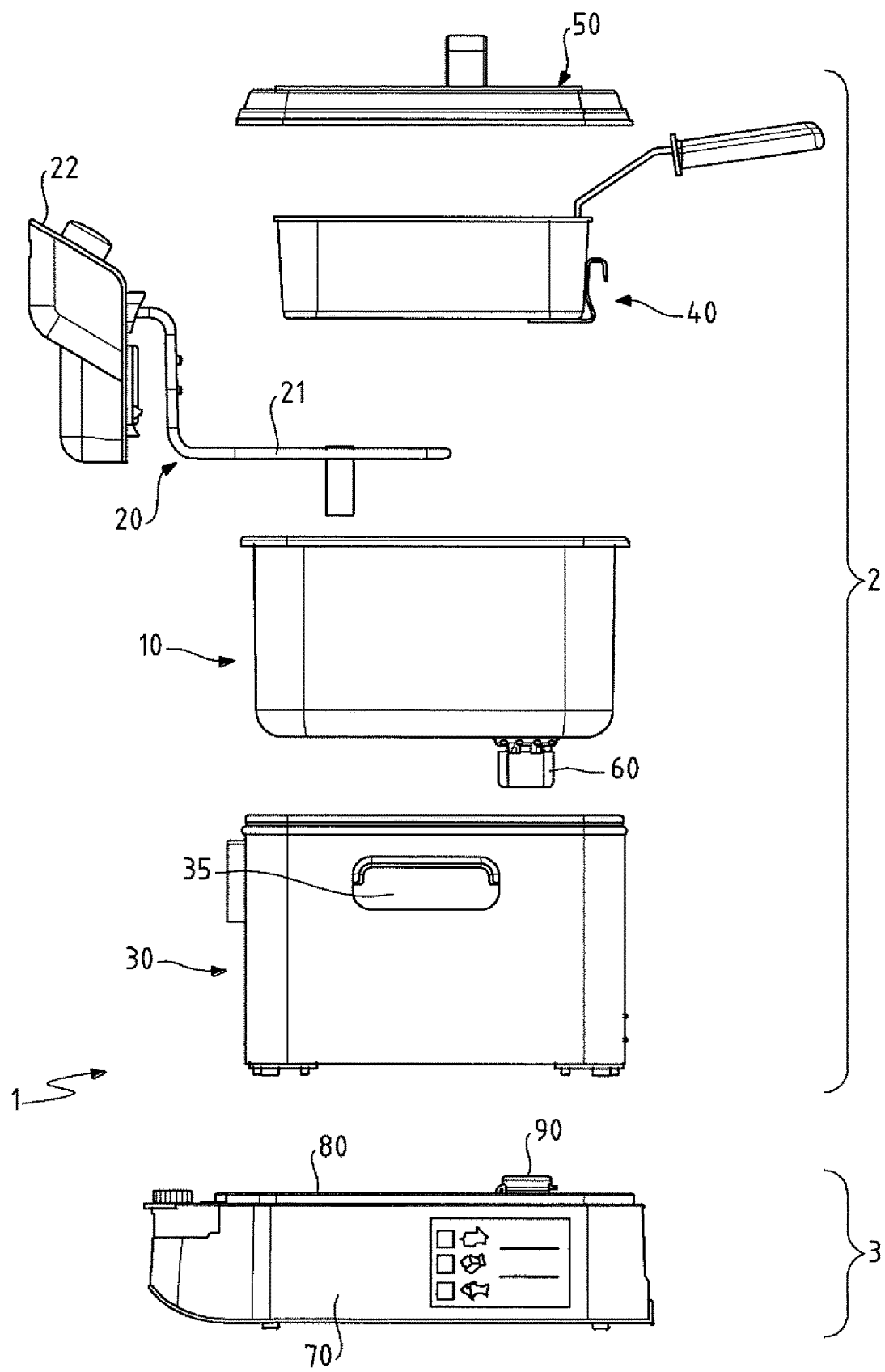
FIG. 1 illustrates an exemplary embodiment of a cooking assembly according to the invention, comprising an electric cooking appliance and a draining base, shown in elevation, the electric cooking appliance being shown in an exploded view.
Figure 2:
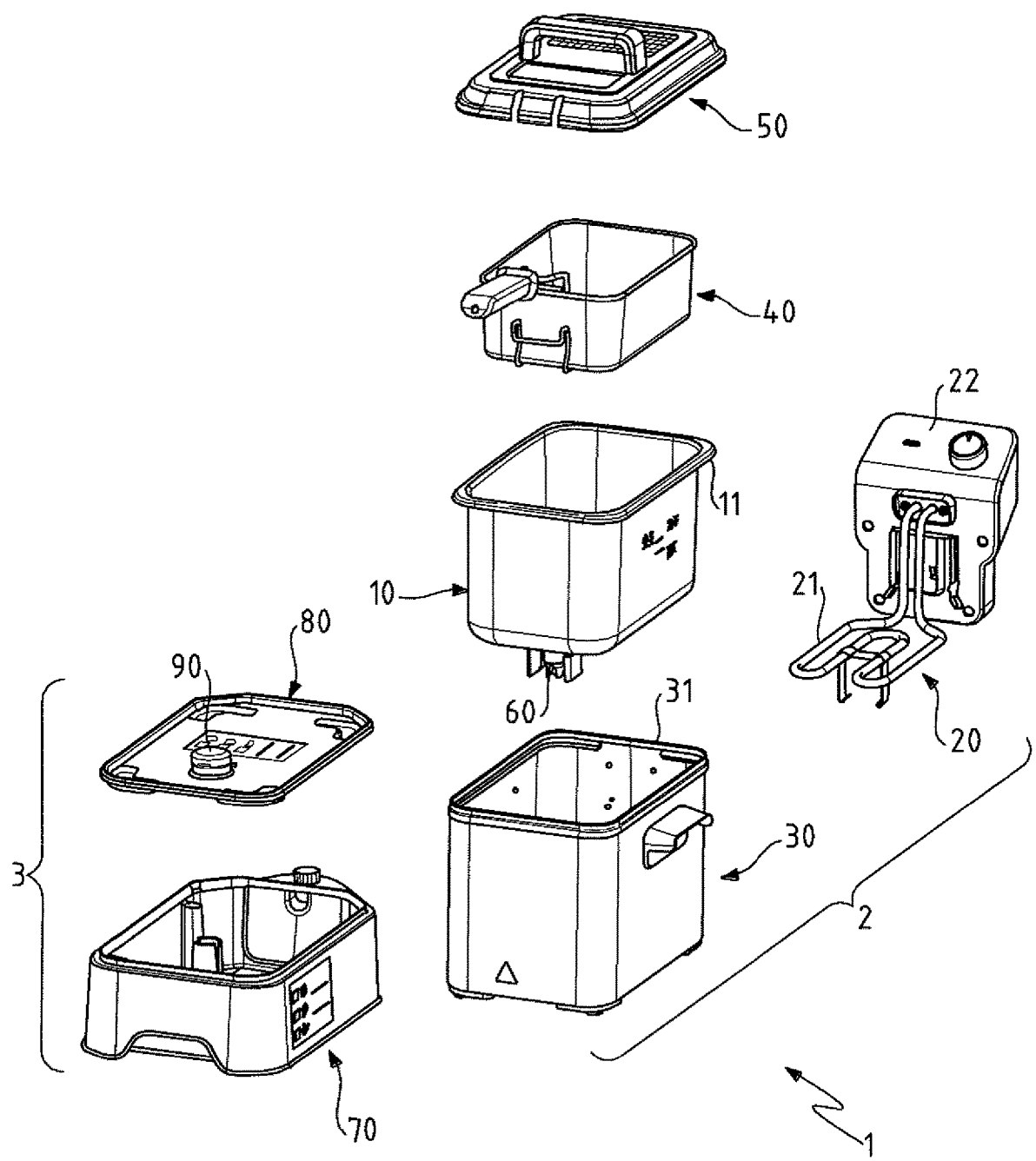
FIG. 2 is a blown-up perspective view of the electric cooking appliance and the draining base of the cooking assembly illustrated in FIG. 1.
Figure 3:
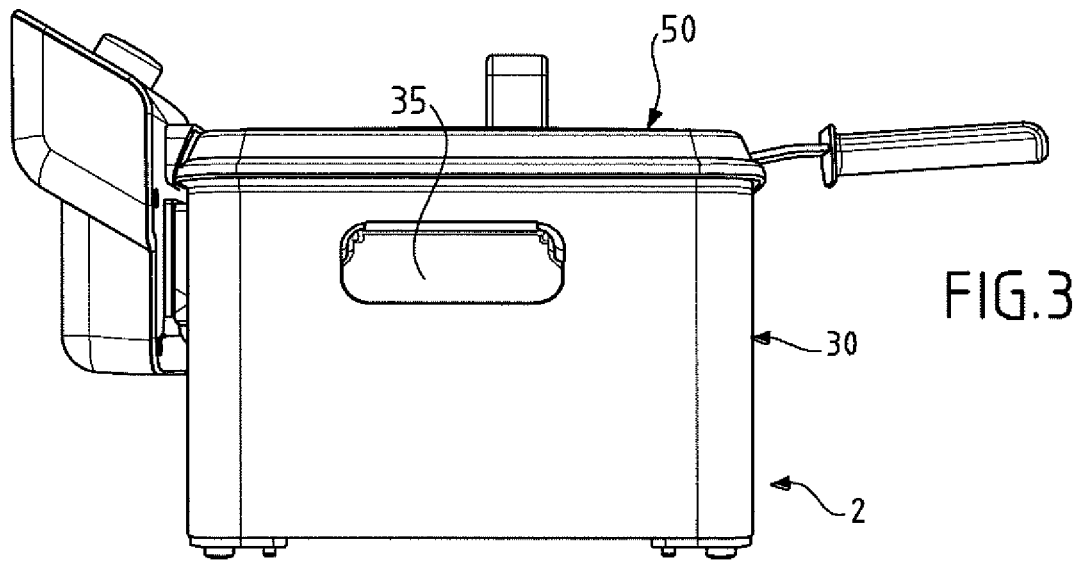
FIG. 3 is a side view of the electric cooking appliance illustrated in FIGS. 1 and 2.

The cooking assembly 1 illustrated in FIGS. 1 and 2 comprises an electric cooking appliance 2 and a draining base 3. The draining base 3 is configured to hold the electric cooking appliance 2.

As can be best seen in FIG. 2, the draining base 3 comprises a draining receptacle 70 and a receptacle lid 80. A lid cap 90 is mounted on the receptacle lid 80.

Figure 4:
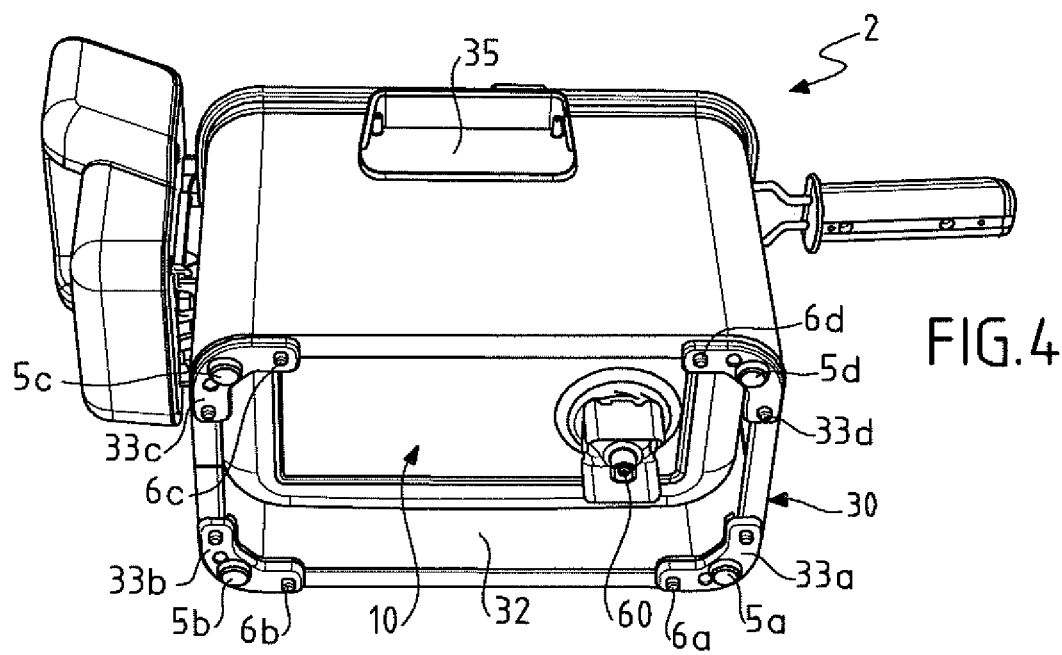
FIG. 4 is a perspective bottom view of the electric cooking appliance illustrated in FIGS. 1, 2 and 3.

As can be seen in FIG. 4, the electric cooking appliance 2 has lower supports 5a, 5b, 5c, 5d spaced apart from each other. The lower supports 5a, 5b, 5c, 5d are configured to rest on a support plane.

The electric cooking appliance 2 comprises a vat 10 capable of receiving a cooking bath. The vat 10 is equipped with a drainage system 60, which can be seen in FIGS. 1, 2, 4, 9, 11 and 12.

The electric cooking appliance 2 comprises an electric heating device 20. In the exemplary embodiment illustrated in FIGS. 1 and 2, the electric heating device 20 is designed to directly heat the cooking bath. To this end, the electric heating device 20 comprises an electrical resistor 21 configured to be immersed in a cooking bath contained in the vat 10. The electric heating device 20 also comprises a control box 22 on which the electrical resistor 21 is mounted. If the electrical resistor 21 extends inside the vat 10, the control box 22 extends outside the vat 10. Alternatively or in addition, the electric heating device 20 may in particular be configured to heat the vat 10. The electric heating device 20 can then be attached to the vat 10, or be removable relative to the vat 10. The electric heating device 20 can be associated with a temperature control device and a thermal safety device, not shown in the figures. The temperature control device is, for example, a thermostat. The thermal safety device is, for example, a thermal fuse or a resettable thermal limiter. As a variant, the electric heating device can be configured to heat the vat without being immersed in the cooking bath contained in the vat. The electric heating device is thus not necessarily attached to the vat.

The electric cooking appliance 2 can comprise an outer housing 30 encasing the vat 10. As can be best seen in FIGS. 4, 9 and 10, the outer housing 30 forms a skirt 32. The skirt 32 has four sides. The outer housing 30 comprises separate housing feet 33a, 33b, 33c, 33d, which can be best seen in FIG. 4. According to the embodiment illustrated in the figures, the housing feet 33a, 33b, 33c, 33d are arranged in the lower angles of the outer housing 30 and extend in two directions under the sides of the skirt. Thus, the housing feet 33a, 33b, 33c, 33d are L-shaped. The lower supports 5a, 5b, 5c, 5d are arranged under the housing feet 33a, 33b, 33c, 33d.

As shown in FIGS. 1 and 2, the vat 10 is removably mounted in the outer housing 30. The outer housing 30 can have gripping elements 35, in particular two opposite upper handles. According to a usual embodiment, the vat 10 has an outer edge 11 configured to rest on an upper edge 31 of the outer housing 30, as can be best seen in FIG. 2. As an alternative, the vat 10 may in particular be attached to the outer housing 30, or the electric cooking appliance 2 may in particular be devoid of an outer housing 30.

The electric cooking appliance 2 can comprise a basket 40 configured to contain foods immersed in a cooking bath contained in the vat 10.

The electric cooking appliance 2 can comprise an appliance lid 50 designed to cover the vat 10. If desired, the appliance lid 50 can be configured for use in the operating configuration. Alternatively, the appliance lid 50 can be configured for use only in the storage configuration.

Figure 9:
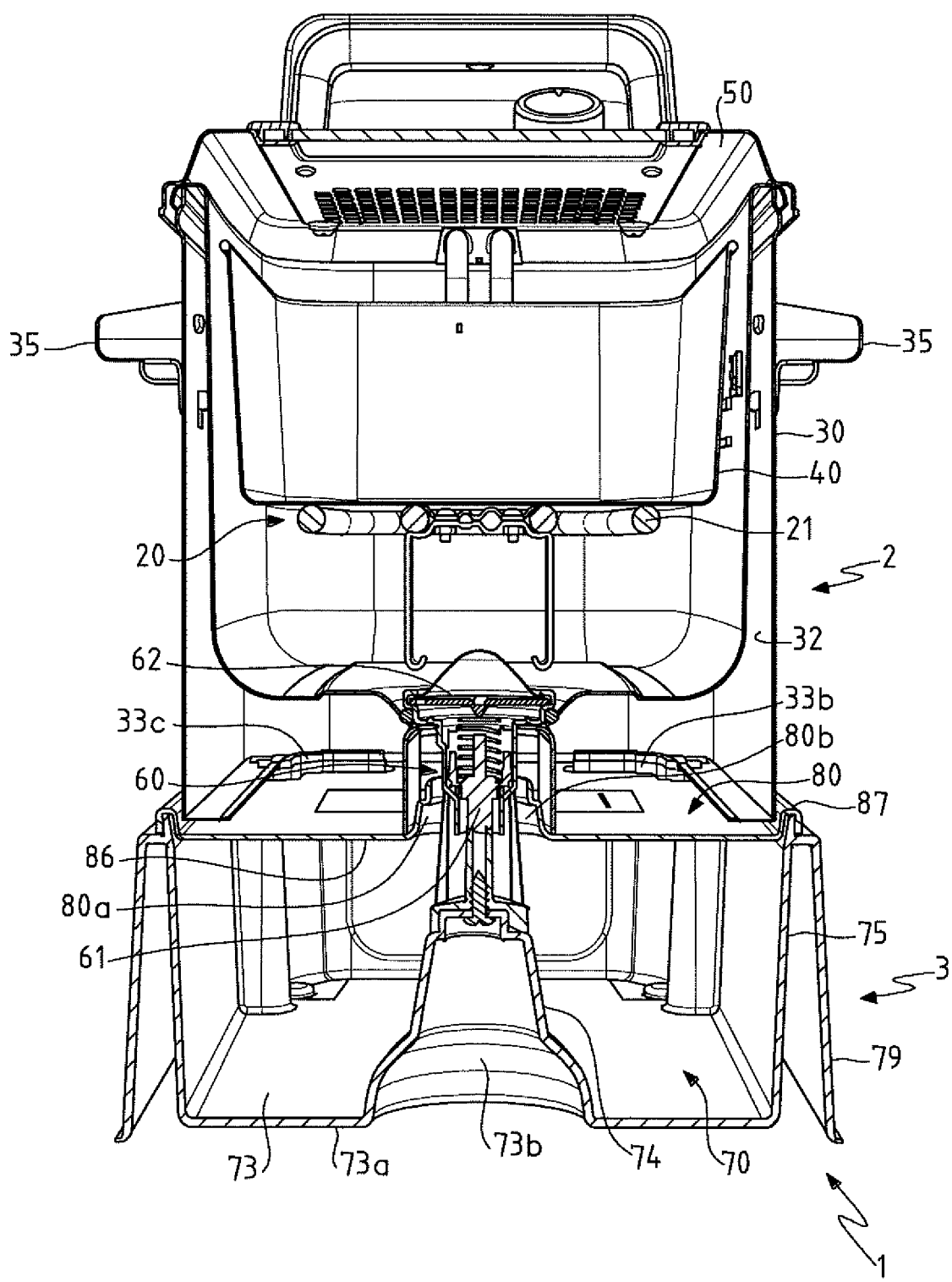
FIG. 9 is a cross-section view in elevation of the cooking assembly illustrated in FIGS. 1 and 2, in a drainage configuration corresponding to a recommended drainage configuration in which the receptacle lid is used to close the draining receptacle.

The drainage system 60 comprises a valve 61, which can be best seen in FIG. 9. The drainage system 60 is preferably installed in the bottom of the vat 10. If desired, a thermostat valve 62 can be arranged upstream of the valve 61 to prevent the cooking bath from draining if the cooking temperature is too high.

Figure 5:
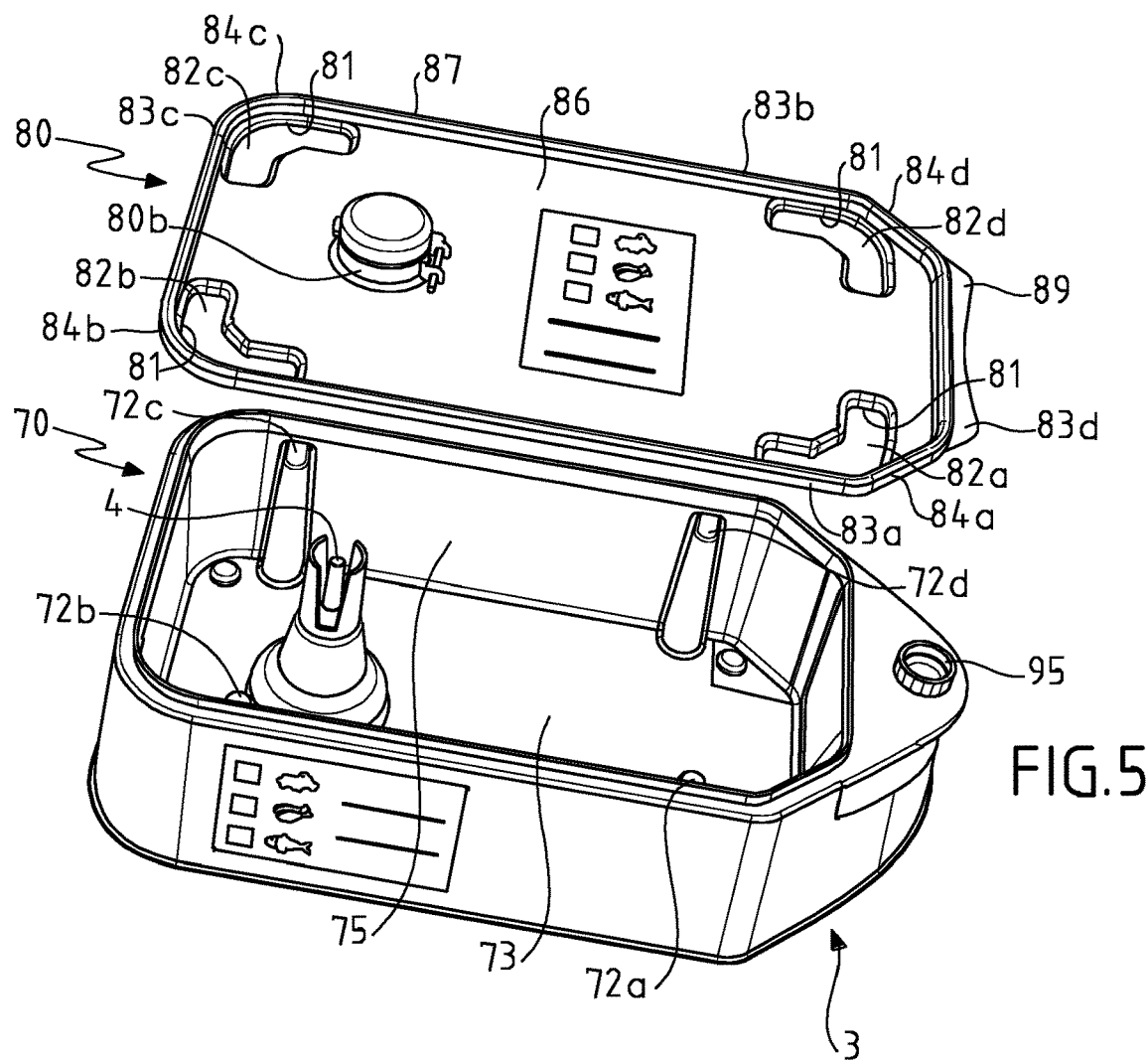
FIG. 5 is a blown-up perspective view of the draining base illustrated in FIGS. 1 and 2.
Figure 6:
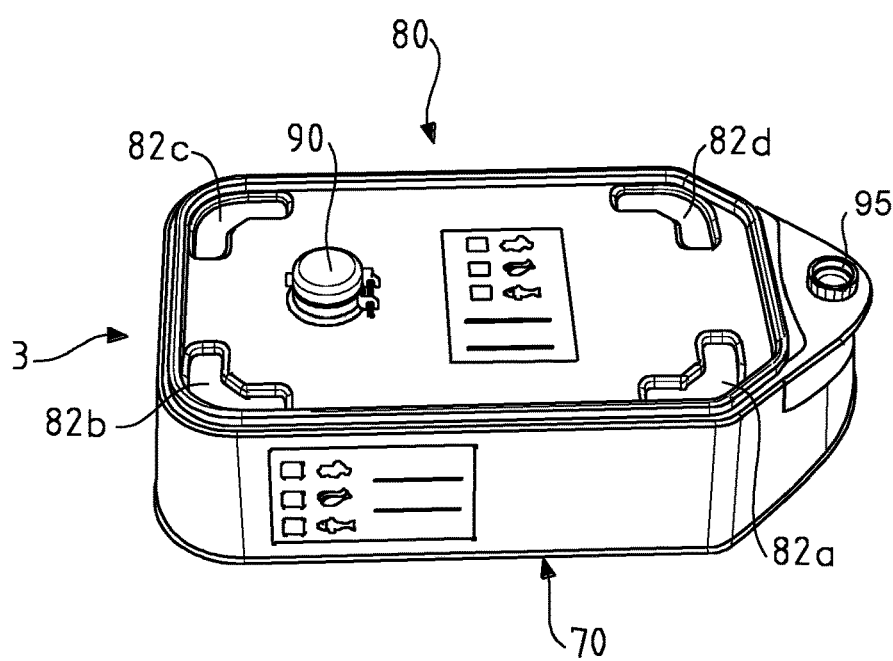
FIG. 6 is an assembled perspective view of the draining base illustrated in FIGS. 1, 2 and 5.
Figure 7:
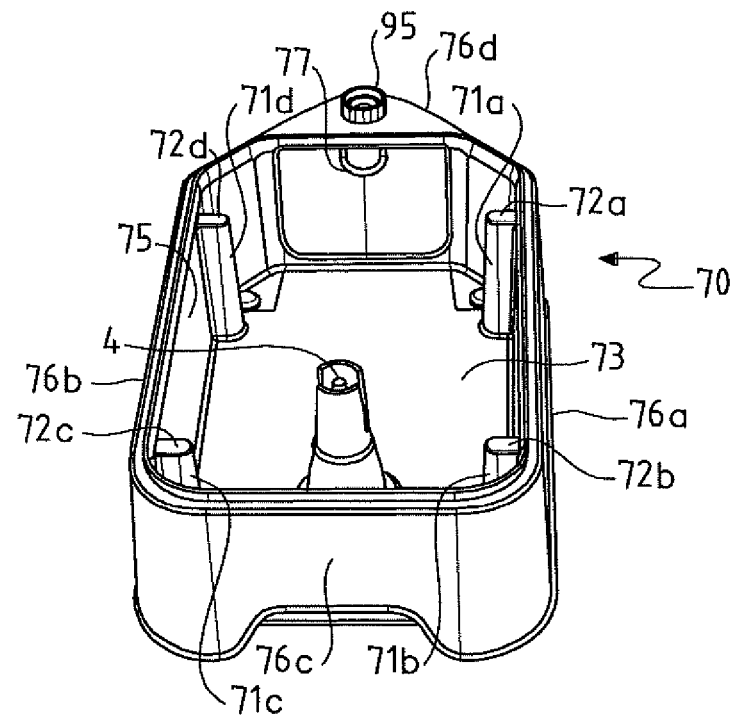
FIG. 7 is a perspective top view of a draining receptacle belonging to the draining base illustrated in FIGS. 1, 2, 5 and 6.
Figure 8:
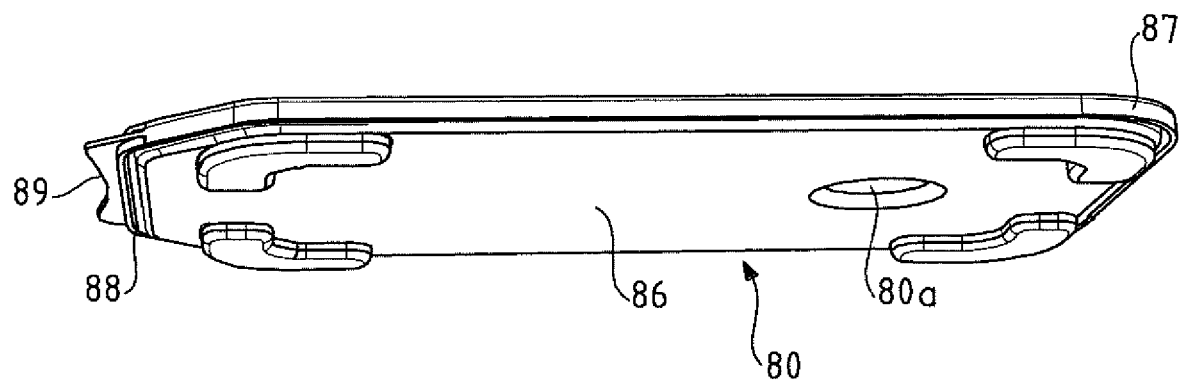
FIG. 8 is a perspective bottom view of a receptacle lid belonging to the draining base illustrated in FIGS. 1, 2, 5 and 6.
Figure 11:
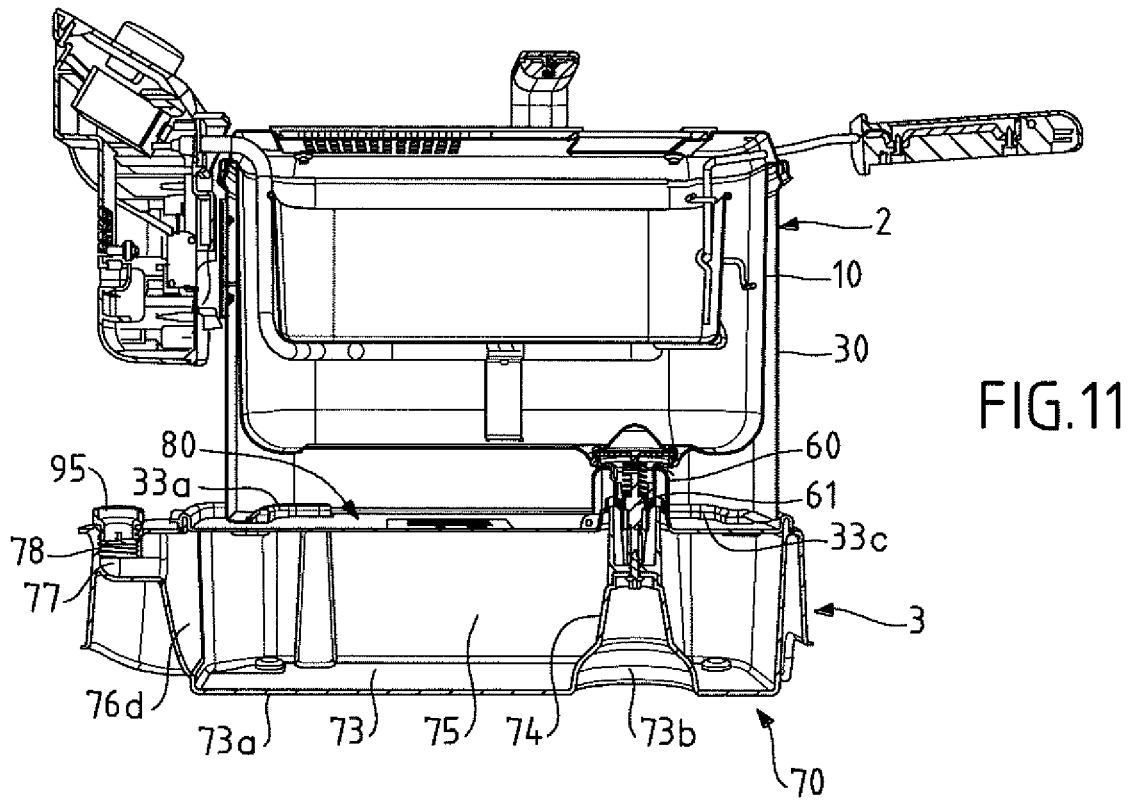
FIG. 11 is a cross-section view in elevation of the cooking assembly illustrated in FIGS. 1, 2, 9 and 10, in the drainage configuration corresponding to the recommended drainage configuration.
Figure 12:
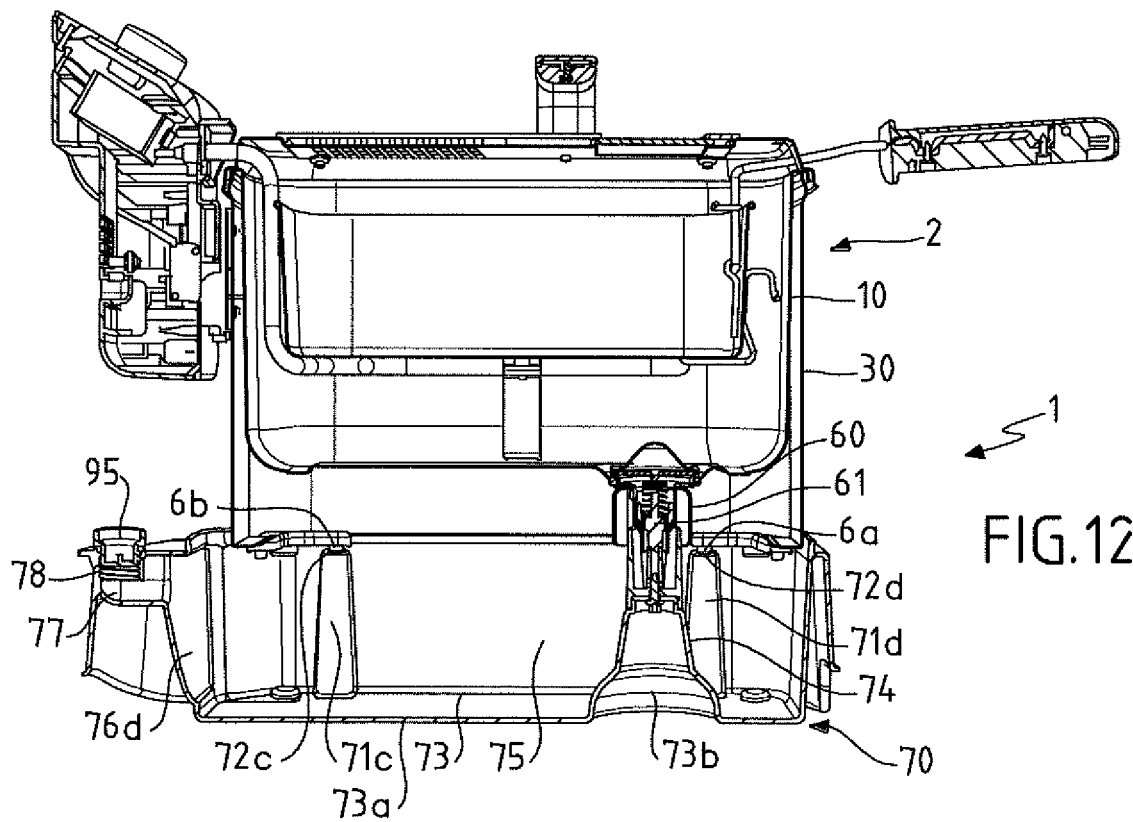
FIG. 12 is a cross-section view in elevation of the cooking assembly illustrated in FIGS. 1, 2, 9, 10, 11, in a drainage configuration corresponding to an alternative drainage configuration, in which the receptacle lid is not used.

The draining base 3 has a control element 4, which can be best seen in FIGS. 5 and 7. The control element 4 is designed to actuate the valve 61. The valve 61 is capable of assuming a stable closed return position, in the absence of external action, to contain the cooking bath in the vat 10, and an open position, to enable the cooking bath to be drained, when the valve 61 is pushed back by the control element 4, as shown in FIGS. 9, 11 and 12. Thus, the control element 4 is configured to move the valve 61 to the open position when the draining base 3 is holding the electric cooking appliance 2. More particularly, in the exemplary embodiment illustrated in FIGS. 1 to 15, the draining receptacle 70 has the control element 4. Alternatively, the receptacle lid 80 may have the control element 4.

As can be seen in FIGS. 5 and 7, the draining receptacle 70 has a bottom 73 and a side wall 75 rising from the bottom 73 of the receptacle. The draining receptacle 70 has a configuration that extends in one direction. The draining receptacle 70 has two opposite sides 76a, 76b. The two opposite sides 76a, 76b extend in said direction. A third side 76c is arranged perpendicular to both sides 76a, 76b. A fourth side 76d extends opposite the third side 76c. The side wall 75 houses a conduit 77 leading into a pour opening 78, as can be best seen in FIGS. 11 and 12. The conduit 77 is arranged in the fourth side 76d. A receptacle cap 95 closes the pour opening 78. The draining receptacle 70 comprises an outer peripheral wall 79 surrounding the side wall 75, which can be best seen in FIG. 9. The outer peripheral wall 79 extends away from a lower part of the side wall 75 of the draining receptacle 70.

Figure 10:
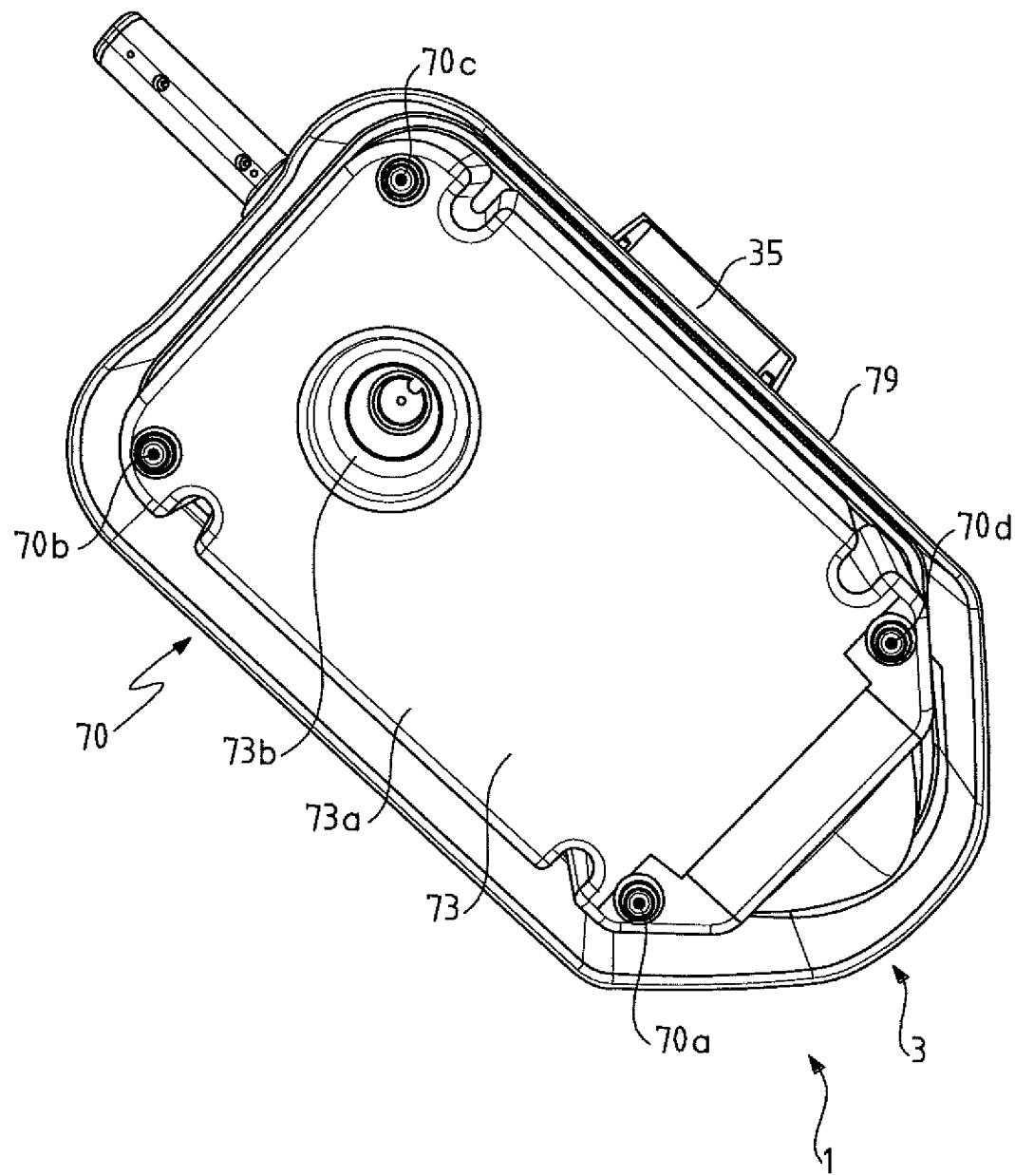
FIG. 10 is a bottom view of the cooking assembly illustrated in FIGS. 1, 2 and 9, in the drainage configuration corresponding to the recommended drainage configuration.

As can be best seen in FIGS. 9 and 10, the draining receptacle 70 has a lower face 73a comprising a housing 73b. Thus, the housing 73b is arranged under the bottom 73 of the receptacle. As can be seen in FIG. 9, the control element 4 originates from the lower face 73a of the draining receptacle 70 and the housing 73b extends below the control member 4.

As can be best seen in FIG. 7, the draining receptacle 70 comprises upper supports 72a, 72b, 72c, 72d. More particularly, the upper supports 72a, 72b, 72c, 72d originate from the side wall 75 of the draining receptacle 70. The upper supports 72a, 72b, 72c, 72d belong to pillars 71a, 71b, 71c, 71d originating from the bottom 73 of the receptacle. Pillars 71a, 71b, 71c, 71d originate from the lateral wall 75. Each of the upper supports 72a, 72b, 72c, 72d originates from the bottom 73 of the receptacle. All pillars 71a, 71b, 71c, 71d originate from opposite sides 76a, 76b.

As a variant, at least some of the pillars 71a, 71b, 71c, 71d may originate from one of the opposite sides 76a, 76b.

As can be best seen in FIG. 10, the draining receptacle 70 comprises receptacle feet 70a, 70b, 70c, 70d spaced apart from each other.

In the exemplary embodiment illustrated in the figures, the control element 4 originates from the draining receptacle 70. More particularly, the control element 4 originates from the bottom of the receptacle 73. The control element 4 is arranged at a distance from the side wall 75. As can be best seen in FIGS. 5, 7, 9, 11, 12 and 15, the bottom 73 of the receptacle has a protuberance 74 that holds the housing 73b.

As can be best seen in FIG. 9, the control element 4 is formed by an attached part mounted on the protuberance 74.

The receptacle lid 80 is configured to be mounted on the draining receptacle 70. The receptacle lid 80 houses an outlet 80a for the flow of the cooking bath into the draining receptacle 70 when the receptacle lid 80 is in place on the draining receptacle 70 to form the draining base 3 and when the draining base 3 is holding the electric cooking appliance 2. Thus, when the receptacle lid 80 is mounted on the draining receptacle 70, the receptacle lid 80 closes the draining receptacle 70, with the exception of the outlet 80a. The receptacle lid 80 has a peripheral edge 87 with a lower housing 88, as can be best seen in FIG. 8. The peripheral edge 87 has an external tongue 89 intended to facilitate the removal of the receptacle lid 80 from the draining receptacle 70. The receptacle lid 80 has a chimney 80b rising above a separating wall 86, as can be seen in FIG. 9. The separating wall 86 is surrounded by the peripheral edge 87. More particularly, in the exemplary embodiment illustrated in the figures, the chimney 80b houses the outlet 80a.

The lid cap 90 is designed to close the outlet 80a. In the exemplary embodiment illustrated in the figures, the lid cap 90 is mounted on the receptacle lid 80 such that it can move between a drain position in which the outlet 80a is open, not shown in the figures, and a storage position in which the outlet 80a is closed by the lid cap 90, shown in FIGS. 1, 2, 5 and 6. More particularly, in the exemplary embodiment illustrated in the figures, the lid cap 90 is pivotally mounted on the receptacle lid 80. The lid cap 90 is supported by the chimney 80b. If desired, the lid cap 90 can be removed from the receptacle lid 80. As shown in FIGS. 9, 11 and 12, the lid cap 90 has been removed from the receptacle lid 80. The lid cap 90 closes the outlet 80a when the draining base 3 is in the configuration for storing the cooking bath contained in the draining receptacle 70, as shown in FIG. 6.

In FIGS. 9, 11 and 12, the cooking assembly 1 is in a drainage configuration in which the control element 4 moves the valve 61 to the open position.

In FIGS. 9 and 11, the drainage configuration corresponds to a recommended drainage configuration, in which the draining base 3 is holding the electric cooking appliance 2. When the cooking assembly 1 is in this drainage configuration, the electric cooking appliance 2 rests on the receptacle lid 80. More particularly in the illustrated exemplary embodiment, the outer housing 30 rests on the receptacle lid 80 when the cooking assembly 1 is in this drainage configuration.

The receptacle lid 80 comprises side stops 81, which can be best seen in FIG. 5. The side stops 81 are configured to limit the lateral movements of the electric cooking appliance 2 resting on the receptacle lid 80. More particularly, the side stops 81 are surrounded by the outer edge 87.

The receptacle lid 80 presents an upper face comprising depressions 82a, 82b, 82c, 82d. The side stops 81 are formed by side walls of the depressions 82a, 82b, 82c, 82d.

The receptacle lid 80 has four main sides 83a, 83b, 83c, 83d. Each of the depressions 82a, 82b, 82c, 82d is arranged in an angle 84a, 84b, 84c, 84d defined by two main adjacent sides 83a, 83b, 83c, 83d, in this case the main sides 83a, 83d for angle 84a, the main sides 83a, 83c for angle 84b, the main sides 83c, 83b for angle 84c, the main sides 83b, 83d for angle 84d, as can be clearly seen in FIG. 5. One of the main sides 83a, 83b, 83c, 83d has several sections.

As a variant, the receptacle lid 80 may have several main sides 83a, 83b, 83c, 83d, and at least one of the depressions 82a, 82b, 82c, 82d may be arranged in an angle 84a, 84b, 84c, 84d defined by two adjacent main sides 83a, 83b, 83c, 83d.

As a variant, the receptacle lid 80 may have an upper face comprising at least one depression, the side stops being formed by side walls of the depression. If desired, said depression can in particular be annular or alveolar.

As can be partially seen in FIGS. 9 and 11, the separate housing feet 33a, 33b, 33c, 33d are configured to rest on the receptacle lid 80 when the cooking assembly 1 is in the drainage configuration. More particularly, the housing feet 33a, 33b, 33c, 33d rest in the depressions 82a, 82b, 82c, 82d when the cooking assembly 1 is in the drainage configuration.

The upper supports 72a, 72b, 72c, 72d extend under the receptacle lid 80 when the receptacle lid 80 closes the draining receptacle 70. As can be seen in FIG. 5, the upper supports 72a, 72b, 72c, 72d are arranged below the depressions 82a, 82b, 82c, 82d. When the electric cooking appliance 2 rests on the receptacle lid 80, the lower supports 5a, 5b, 5c, 5d are arranged vertically above the upper supports 72a, 72b, 72c, 72d.

In FIG. 12, the drainage configuration corresponds to an alternative configuration, in which the draining receptacle 70 holds the electric cooking appliance 2. The electric cooking appliance 2 rests on the upper supports 72a, 72b, 72c, 72d when the cooking assembly 1 is in this drainage configuration. More particularly in the illustrated exemplary embodiment, the outer housing 30 rests on the draining receptacle 70 when the cooking assembly 1 is in this drainage configuration.

The electric cooking appliance 2 has support zones 6a, 6b, 6c, 6d, which can be seen in FIG. 4. When the lower supports 5a, 5b, 5c, 5d rest on a support plane, the support zones 6a, 6b, 6c, 6d extend away from said support plane. When the cooking assembly 1 is in the drainage configuration, the support zones 6a, 6b, 6c, 6d rest on the upper supports 72a, 72b, 72c, 72d as can be partially seen in FIG. 12. More particularly in the illustrated exemplary embodiment, the lower supports 5a, 5b, 5c, 5d are arranged under the skirt 32, and the support zones 6a, 6b, 6c, 6d are arranged under the skirt 32. The support zones 6a, 6b, 6c, 6d originate from the feet of the housing 33a, 33b, 33c, 33d. The support zones 6a, 6b, 6c, 6d are separate from the lower supports 5a, 5b, 5c, 5d.

Figure 15:
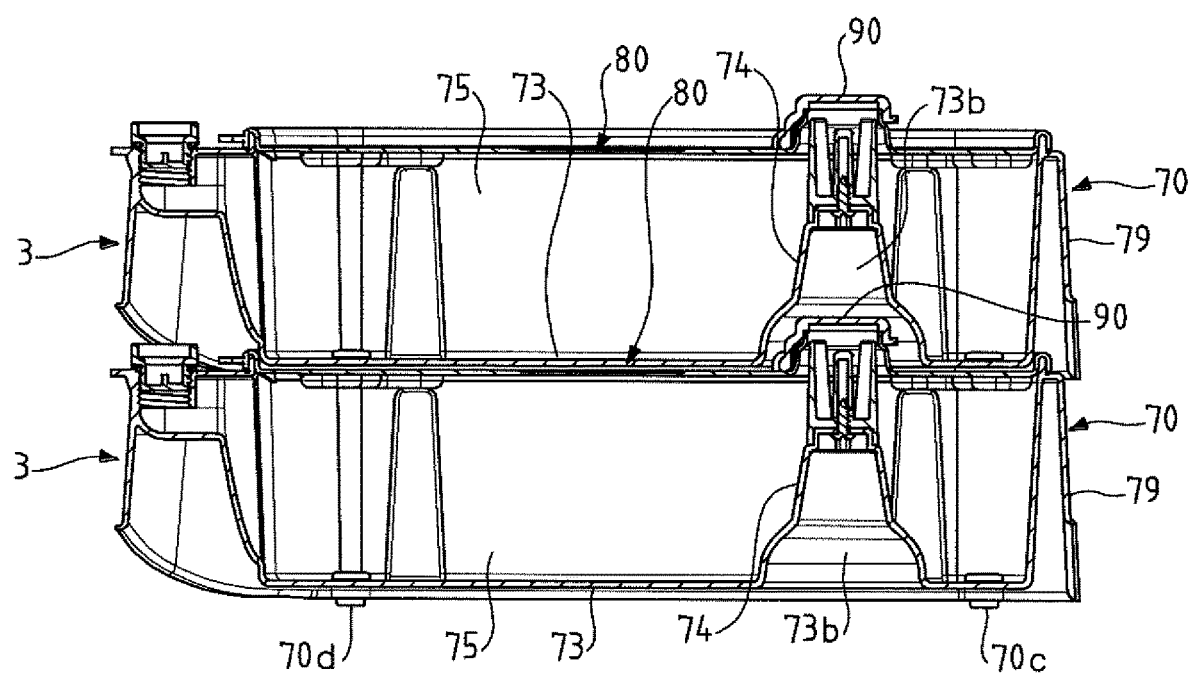
FIG. 15 is a second longitudinal cross-section view of the stacked draining bases illustrated in FIGS. 13 and 14.

The draining receptacle 70 and the receptacle lid 80 can be placed in a stacking configuration in which the draining receptacle 70 rests on the receptacle lid 80 and in which the housing 73b houses the lid cap 90 closing the outlet 80a of the receptacle lid 80, as can be seen in FIG. 15 illustrating two stacked draining bases 3.

Figure 13:
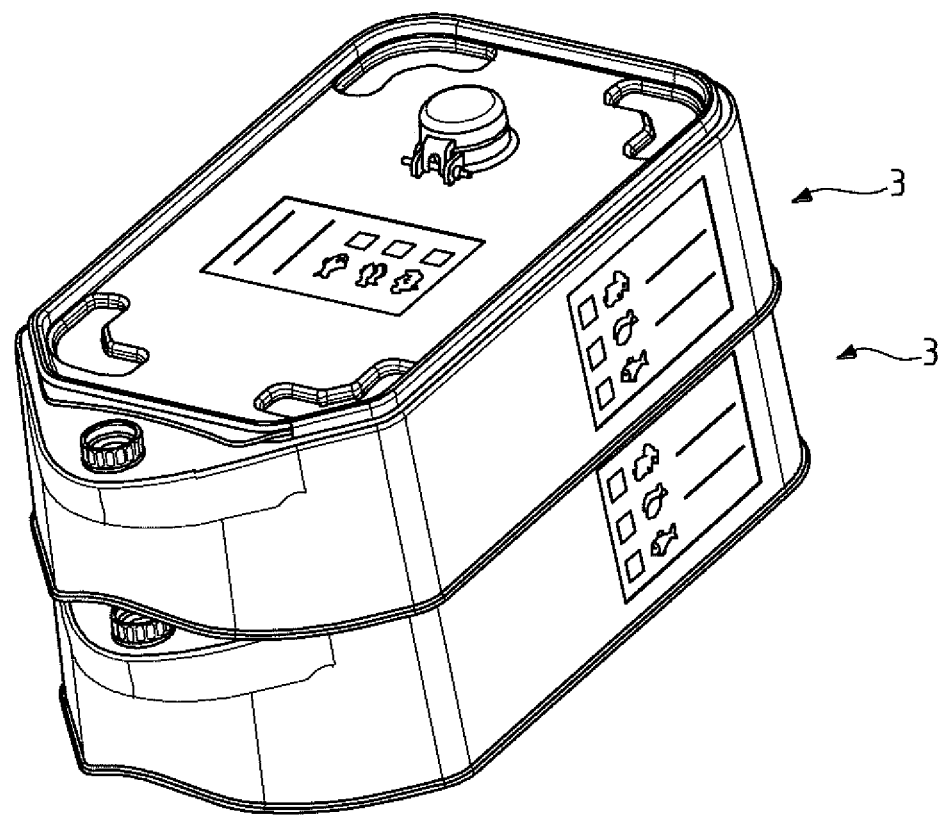
FIG. 13 is a perspective view of a storage configuration in which two draining bases illustrated in FIGS. 1, 2, 5 and 6 are stacked.
Figure 14:
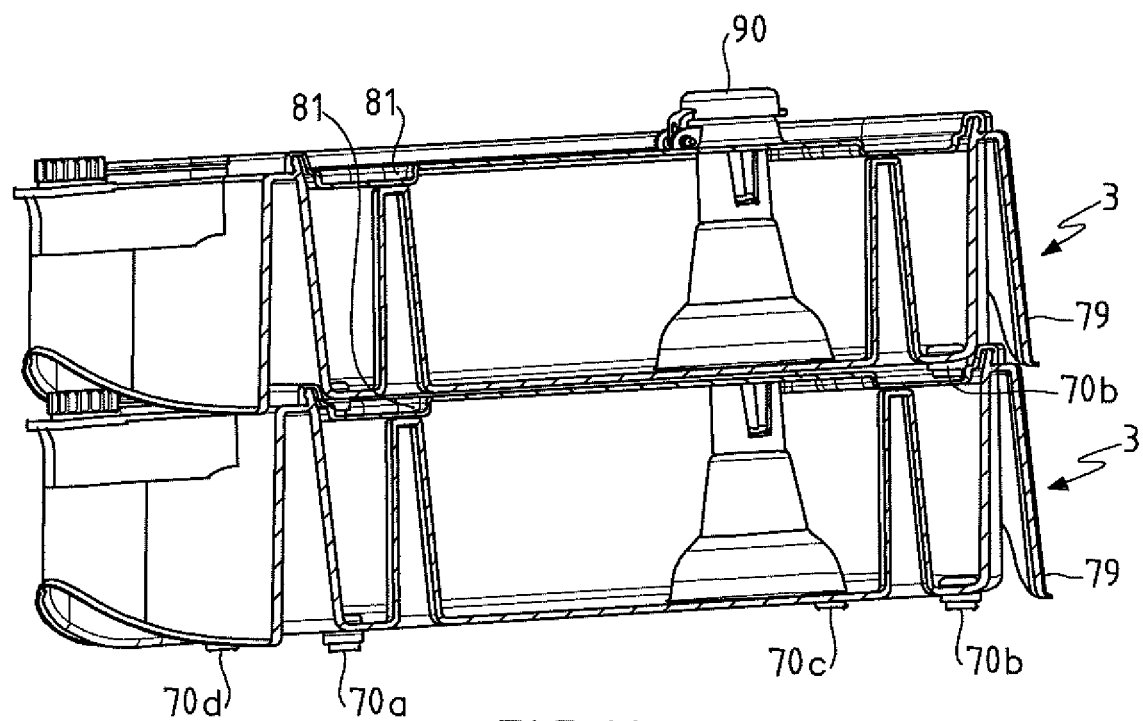
FIG. 14 is a first longitudinal cross-section view of the stacked draining bases illustrated in FIG. 13.

As shown in FIGS. 13 to 15, two draining bases 3 can be stacked. The side stops 81 are configured to limit the lateral movements of the draining receptacle 70 resting on the receptacle lid 80 in the stacking configuration. The receptacle feet 70a, 70b, 70c, 70d are configured to rest on the receptacle lid 80 when the draining receptacle 70 and the receptacle lid 80 are in the stacking configuration. More particularly, the receptacle feet 70a, 70b, 70c, 70d rest in the depressions 82a, 82b, 82c, 82d when the draining receptacle 70 and the receptacle lid 80 are in the stacking configuration. The upper supports 72a, 72b, 72c, 72d extend under the receptacle lid 80 when the receptacle lid 80 closes the draining receptacle 70. More particularly, the upper supports 72a, 72b, 72c, 72d are arranged below the depressions 82a, 82b, 82c, 82d. The outer peripheral wall 79 extends around the receptacle lid 80 when the draining receptacle 70 and the receptacle lid 80 are in the stacking configuration.

The cooking assembly 1 illustrated in FIGS. 1 and 2 is used in the following manner. To drain a cooking bath contained in the vat 10, the user places the receptacle lid 80 on the draining receptacle 70 to form the draining base 3, removes the lid cap 90, and positions the electric cooking appliance 2 on the draining base 3. The housing feet 33a, 33b, 33c, 33d rest in the depressions 82a, 82b, 82c, 82d. The control element 4 moves the valve 61 to the open position. The side stops 81 make it possible to stabilize the electric cooking appliance 2 on the draining base 3. Once the cooking bath has been drained, the user can remove the electric cooking appliance 2 and place the lid cap 90 on the receptacle lid 80 to store the cooking bath before using it again.

Various obvious modifications and/or improvements for the person skilled in the art can be made to the embodiment of the invention described in this description without departing from the scope of the invention defined by the claims.

The invention claimed is:

1. A cooking assembly comprising:
    an electric cooking appliance; and
    a draining base,
    the electric cooking appliance comprising a vat configured to receive a cooking bath, the vat equipped with a drainage system comprising a valve configured to assume a stable closed return position and an open position,
    the draining base comprising a draining receptacle and a receptacle lid, the receptacle lid housing an outlet for the cooking bath to flow into the draining receptacle, the draining base comprising a control element,
    the cooking assembly having a drainage configuration in which the draining base holds the electric cooking appliance and in which the control element moves the valve to the open position,
    wherein the electric cooking appliance comprises an outer housing encasing the vat and wherein the outer housing rests on the receptacle lid when the cooking assembly is in the drainage configuration,
    wherein the receptacle lid has an upper side comprising depressions,
    wherein the draining receptacle comprises upper supports extending under the receptacle lid when the receptacle lid closes the draining receptacle, the upper supports arranged below the depressions, and
    wherein the outer housing comprises separate housing feet configured to rest on the depressions of the receptacle lid when the cooking assembly is in the drainage configuration.

2. The cooking assembly according to claim 1, wherein the receptacle lid comprises side stops configured to limit the lateral movements of the electric cooking appliance resting on the receptacle lid.

3. The cooking assembly according to claim 2, wherein the receptacle lid has an upper side comprising depressions, wherein the side stops are formed by side walls of the depressions.

4. The cooking assembly according to claim 3, wherein the receptacle lid has several main sides, and wherein at least one of the depressions is arranged in an angle defined by two adjacent main sides.

5. The cooking assembly according to claim 3, wherein the receptacle lid has four main sides, and wherein each of the depressions is arranged in an angle defined by two adjacent main sides.

6. The cooking assembly according to claim 2, wherein the receptacle lid has a peripheral edge and wherein the side stops are surrounded by the peripheral edge.

7. The cooking assembly according to claim 1, wherein the outer housing forms a skirt.

8. The cooking assembly according to claim 1, wherein the receptacle lid has an upper side comprising depressions wherein the side stops are formed by side walls of the depressions, and the housing feet rest in the depressions when the cooking assembly is in the drainage configuration.

9. The cooking assembly according to claim 1, wherein the draining receptacle comprises upper supports extending under the receptacle lid when the receptacle lid closes the draining receptacle.

10. The cooking assembly according to claim 9, wherein the upper supports originate from a side wall of the draining receptacle.

11. The cooking assembly according to claim 9, wherein the upper supports belong to pillars extending from a bottom of the draining receptacle.

12. The cooking assembly according to claim 9, wherein the side stops are formed by side walls of the depressions, and wherein the upper supports are vertically aligned with the housing feet.

13. The cooking assembly according to claim 9, wherein the electric cooking appliance has lower supports spaced apart from each other and wherein the lower supports are arranged vertically above the upper supports when the cooking appliance rests on the receptacle lid.

14. The cooking assembly of claim 1, wherein at least one of the housing feet includes a lower support extending therefrom.

15. A cooking assembly comprising: an electric cooking appliance; and a draining base, the electric cooking appliance comprising a vat configured to receive a cooking bath, the vat equipped with a drainage system comprising a valve configured to assume a stable closed return position and an open position, the draining base comprising a draining receptacle and a receptacle lid, the receptacle lid housing an outlet for the cooking bath to flow into the draining receptacle, the draining base comprising a control element, the cooking assembly having a drainage configuration in which the draining base holds the electric cooking appliance and in which the control element moves the valve to the open position, wherein the electric cooking appliance rests on the receptacle lid when the cooking assembly is in the drainage configuration, wherein the receptacle lid comprises side stops configured to limit the lateral movements of the electric cooking appliance resting on the receptacle lid, wherein the receptacle lid has an upper side comprising depressions configured to receive and provide stability to the electric cooking appliance, wherein the side stops are formed by side walls of the depressions, and wherein the receptacle lid has several main sides, and wherein at least one of the depressions is arranged in an angle defined by two adjacent main sides, and wherein the draining receptacle includes upper supports which are vertically aligned with the depressions.

16. The cooking assembly according to claim 15, wherein the receptacle lid has four main sides, and wherein each of the depressions is arranged in an angle defined by two adjacent main sides.

17. The cooking assembly according to claim 15, wherein the receptacle lid has a peripheral edge and wherein the side stops are surrounded by the peripheral edge.

\* \* \* \* \*